J. W. FITZ GERALD.
POWER JACK FOR MOTOR VEHICLES.
APPLICATION FILED MAR. 23, 1918.

1,281,544.

Patented Oct. 15, 1918.

Inventor
John W. FitzGerald

By Whittemore Hulbert & Whittemore
Attorneys

UNITED STATES PATENT OFFICE.

JOHN W. FITZ GERALD, OF DETROIT, MICHIGAN, ASSIGNOR TO L. A. YOUNG INDUSTRIES, INC., OF DETROIT, MICHIGAN, A CORPORATION OF MICHIGAN.

POWER-JACK FOR MOTOR-VEHICLES.

1,281,544.        Specification of Letters Patent.       Patented Oct. 15, 1918.

Application filed March 23, 1918. Serial No. 224,152.

*To all whom it may concern:*

Be it known that I, JOHN W. FITZ GERALD, a citizen of the United States of America, residing at Detroit, in the county of Wayne and State of Michigan, have invented certain new and useful Improvements in Power-Jacks for Motor-Vehicles, of which the following is a specification, reference being had therein to the accompanying drawings.

The invention relates to mechanism for obtaining power from motor vehicles for the driving of machinery and for similar uses. It is the object of the invention to obtain a simple construction which may be easily applied to the motor vehicle without the assistance of jacks or other lifting means and which when thus applied will hold the driving wheels of the vehicle in frictional driving contact with the power shaft. It is also an object to obtain a construction which will automatically adjust itself to driving wheels of different diameters and will maintain the requisite tension for driving without unduly loading the power shaft. With these objects in view the invention comprises the construction as hereinafter set forth.

Figure 1:
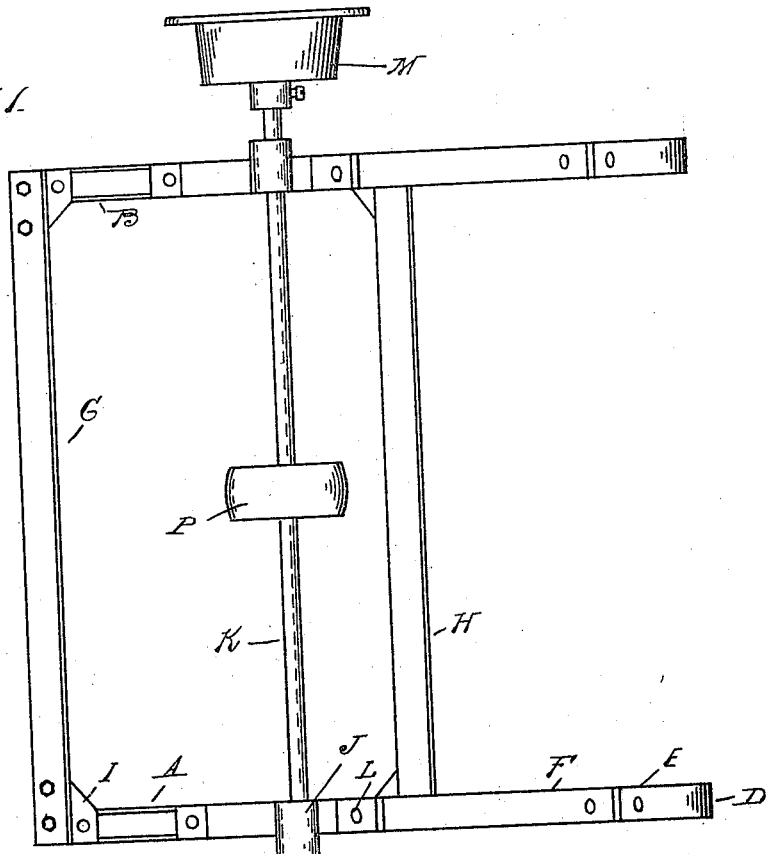
Figure 1 is a plan view of the device.
Figure 2:
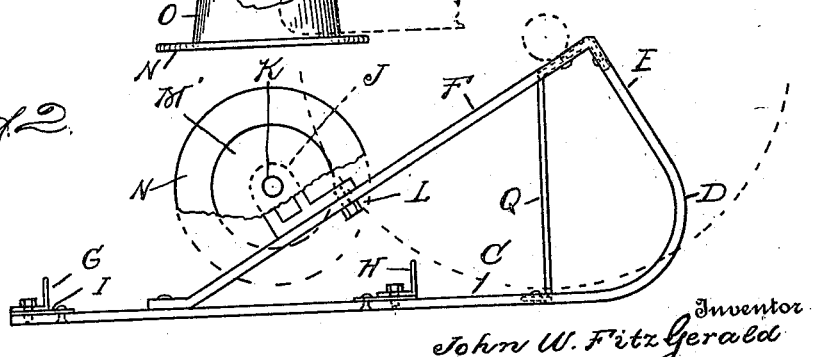
Fig. 2 is a side elevation thereof.

The frame of the machine comprises two light side members A and B, preferably formed of channel bars and having the straight base portion C, the rounded rocker portion D and the angular portions E and F, the whole being substantially triangular in form. The frames A and B are cross connected by struts or cross-bars G and H which are bolted or otherwise secured at their opposite ends and gusset-plates I are preferably used at the corners for strengthening the structure. J are journal bearings for the power-shaft K, said bearings being secured to the inclined portion F of the frames by suitable means such as the clamping bolts L. M and M' are pulleys secured to portions of the shaft projecting beyond the bearings J. These pulleys are preferably provided with guard flanges N at their outer ends and with tapering tread portions O for contacting with the tires of the vehicle wheels. The pulleys are also adjustably secured upon the shaft K so as to be capable of being moved inward or outward thereon.

With the construction as described when it is desired to place the device in engagement with a motor vehicle the frame is rocked upward upon the curved rocker portions D, which will depress the end of the inclined portion F so as to permit of inserting it beneath the axle of the vehicle. The opposite ends of the frames are then depressed which will lift the axle, freeing the drive wheels from contact with the ground and engaging them with the portions O of the pulleys M and M'. When the portions C of the frame are resting upon the ground the inclination of the portions F is such that a portion of the weight of the vehicle will hold the wheels in driving contact with the pulleys, while the rest of the weight is sustained by the frame. Furthermore the axle is free to adjust itself on the inclined bearing into proper relative position to the shaft K and pulleys M and M'. Thus the device can be engaged with vehicles having wheels of different diameters without the necessity of any adjustment, the axle automatically taking the position in proper relation to the driving shaft. In case there is any difference in the tires of the vehicle wheels or anything else which might cause a difference in the driving force transmitted to the pulleys M and M' these pulleys may be adjusted upon the shaft K so that the tapering face O will either increase or decrease the traction.

To strengthen the frames A and B and to sustain the load of the vehicle thereon struts Q may be arranged to extend vertically between the portion F and the portion C, the ends of these struts being bent to engage the channels and riveted or otherwise secured thereto.

Where the frame is resting upon a ground having an uneven surface there may be a tendency to spring slightly out of shape. To avoid cramping the journal-bearings J for the shaft H they are secured to the side frames A and B by single bolts L, which permit of a slight swiveling action when under stress. Thus the bearings are self-alining and will adjust themselves to the shaft even where the frame is slightly sprung.

For transmitting the power to the machine to be driven a suitable pulley is attached to the shaft K, such as shown at P.

What I claim as my invention is:

1. The combination with a rockable frame of bearings on said frame for engaging and lifting the axle of a vehicle when the frame is rocked, a shaft extending transversely of said frame and journaled thereon, and pulleys on said shaft held in friction contact with the vehicle wheels by a portion of the weight of the vehicle.

2. The combination with a rockable frame of bearings on said frame engageable beneath the axle of the vehicle when the frame is tilted and lifting the axle during the rocking of the frame, said bearings assuming an inclined position in the normal position of said frame, a shaft extending transversely of said frame and journaled in bearings thereon, and pulleys on said shaft against which the wheels of the vehicle are held by a portion of the weight of the vehicle when said axle is upon said inclined bearings.

3. The combination with a rockable frame of a shaft extending transversely of said frame and journaled in bearings thereon, pulleys on said shaft, and bearings on said frame engageable with the axle of the vehicle when the frame is tilted and lifting said axle by the rocking of said frame, said bearings permitting the movement of said axle to hold the wheels thereof in friction contact with the pulleys.

4. The combination of a frame having a base portion with a curved rocker at the end thereof and also having a normally inclined portion engageable with the axle of a vehicle when the frame is tilted to lift said axle by a rocking movement, a shaft extending transversely of said frame journaled in bearings thereon, and pulleys on said shaft for engaging the wheels of the vehicle when the axle is engaged with said inclined bearings.

5. A frame comprising a pair of side-members and cross-connections each side member being substantially triangular in form having a base portion, an inclined portion and a forward end portion curved to form a rocker, a shaft extending transversely of said frame journaled in bearings on the inclined portion thereof, and pulleys on said shaft against which the vehicle wheels are pressed when the axle is engaged with said inclined portion.

6. A frame comprising a pair of side-members and cross-connections each of said side-members having a base portion, an inclined portion and a curved rocker portion, a shaft extending transversely of said frame journaled in bearings on the inclined portion thereof, pulleys on said shaft for engaging the vehicle wheels when the axle of the vehicle is supported on said inclined portion, and struts extending between said base and inclined portion at the points at which the axle is supported.

7. The combination with a rockable frame of a shaft extending transversely of said frame and journaled in bearings thereon, pulleys on said shaft for engaging the wheels of the vehicle, bearings on said frame for engaging said axle and lifting the same when the frame is tilted, said bearings normally standing in inclined position and permitting the weight of the vehicle to hold the wheels thereof against said pulleys, and means for adjusting the diameters of the pulleys contacting with said wheels to equalize the traction thereon.

8. The combination with a rockable frame, of bearings on said frame for engaging and lifting the axle of a vehicle when the frame is rocked, a shaft extending transversely of the frame, pulleys on said shaft for engagement with the vehicle wheels, and self-alining bearings for securing said shaft to said frame permitting of automatic adjustment when the frame is sprung.

9. The combination with a frame, of bearings thereon for the axle of the vehicle, a shaft extending transversely of the frame, pulleys on said shaft for engagement with the vehicle wheels, and self-alining bearings for securing said shaft to said frame permitting of automatic adjustment when the frame is sprung.

In testimony whereof I affix my signature.

JOHN W. FITZ GERALD.

Copies of this patent may be obtained for five cents each, by addressing the "Commissioner of Patents, Washington, D. C."